United States Patent [19]
Campi et al.

[11] Patent Number: 5,963,688
[45] Date of Patent: Oct. 5, 1999

[54] NON-LINEAR OPTICAL COUPLER

[75] Inventors: Domenico Campi, Turin; Claudio Coriasso, Leini'; Luca Faustini, Roe'Volciano; Alessandro Stano, Cirie', all of Italy

[73] Assignee: Cselt-Centro Studi Laboratori Telecomunicazioni S.P.A., Turin, Italy

[21] Appl. No.: 09/028,042

[22] Filed: Feb. 23, 1998

[30] Foreign Application Priority Data

Mar. 14, 1997 [IT] Italy .................................. TO97A0210

[51] Int. Cl.$^6$ ....................................................... G02B 6/26
[52] U.S. Cl. ........................................................... 385/50
[58] Field of Search .......................... 372/6, 102; 385/37, 385/50, 147

[56] References Cited

U.S. PATENT DOCUMENTS

| | | | |
|---|---|---|---|
| 5,504,772 | 4/1996 | Deacon et al. | 372/102 |
| 5,581,642 | 12/1996 | Deacon et al. | 385/37 |
| 5,781,670 | 7/1998 | Deacon et al. | 385/37 |

FOREIGN PATENT DOCUMENTS

| | | |
|---|---|---|
| 11451 | 1/1991 | Japan . |
| 80216 | 4/1993 | Japan . |
| 95182 | 4/1994 | Japan . |

OTHER PUBLICATIONS

All–optical waveguide switching, G.I. Stegeman, E.M. Wright Optical Sciences Center, 1990 Chapman and Hall Ltd. pp. 95–122.

IEEE Proceedings–J, vol. 140, No. 5, Oct. 1993 pp. 275–284.

*Primary Examiner*—Akm E. Ullah
*Attorney, Agent, or Firm*—Herbert Dubno

[57] ABSTRACT

An integrated optics non linear coupler presents on a surface a first and a second waveguide (2, 3) coupled contradirectionally by means of a distributed feedback grating (10). The first waveguide (2) defines an input port (4) and a first output port (5) of the device (transmission output) and the second waveguide (3) defines a second output port (6) of the device (reflection output). By means of an optical control signal injected into the device together with an information signal, the device can be brought to conditions of non-linear operation, thus making the grating (10) switch from transmitting to reflecting behaviour or vice versa with respect to a given wavelength.

6 Claims, 2 Drawing Sheets

NON-LINEAR OPTICAL COUPLER

The present invention relates to components for optical communication systems, and more in particular its object is to provide a non-linear optical coupler, utilising a grating, to be used for demultiplexing and routing optical signals.

BACKGROUND OF THE INVENTION

It is well known that optical communication systems are being increasingly oriented towards a fully optical processing of the signal, especially if operation at very high bit rates is required, e.g. bit rates in the order of tens of Gbits/s or higher. Communication systems operating at those bit rates generally employ wavelength-division multiplexing techniques and require tuneable optical filters for demodulating and routing the different channels. An additional requirement is that the components utilised be easily integrated.

Recently, filters based on the use of waveguides with Bragg gratings, and more specifically on the use of waveguides coupled by means of gratings, have been proposed. Those filters are tuneable filters, where gratings reflect the tuning wavelength and transmit the other wavelengths: the wavelength reflected by the grating associated to the first waveguide is coupled into the other waveguide arranged adjacent to the first one and exits through it, whilst the transmitted wavelengths exit through the first waveguide. The paper "Spectral characteristics of coupled-waveguide Bragg-reflection tuneable optical filter", by J. P. Weber, IEE Proceedings—J, Vol. 140, No. 5, October 1993, discloses examples of coupled waveguide filters, and in particular filters which make use of waveguides coupled contradirectionally, wherein the reflected radiation exits from the second waveguide in a direction opposite to the incoming radiation. By bringing the grating of the first waveguide to reflection or transmission conditions for a wavelength of interest, it is possible to use the device as a switch and to send the wavelength to one or the other output. Tuning, and thus the choice of output, is obtained with an electrical control, as can be clearly deduced by examining FIG. 3 in the paper.

The presence of electrical contacts however gives rise to parasitic capacitances which limit switching speed, and hence also the bit rate achievable by the system. Typically, electrically controlled devices cannot be used for bit rates exceeding about forty Gbits/s. Given the dramatic growth of systems requiring broad bandwidths, such as broadcast systems, Internet-type communications systems, etc., interest is growing in components that allow obtaining much higher bit rates than those indicated, e.g. rates of a few hundreds of Gbits/s.

The possibility of obtaining contradirectional coupling between two waveguides by means of an optically controlled grating is illustrated by G. I. Stegeman and E. M. Wright in the paper "All-optical waveguide switching", Optical and Quantum Electronics 22, 1990, pp. 95 et seq. The paper, however, describes only the theoretical principle and not the practical embodiment of a device exploiting that principle.

SUMMARY OF THE INVENTION

The invention provides a coupler comprising: a first and a second waveguide, of which the first one defines an input port and a first output port of the device and the second one defines a second output port of the device; a grating to couple contradirectionally the first and the second waveguide and to transfer an optical information signal to the first or to the second output, respectively by transmission or by reflection; means for injecting into the first waveguide an optical information signal and a possible control signal capable of bringing the grating from a reflecting condition to a transmitting condition for a predetermined wavelength and vice versa; and means for extracting the information signal from said outputs. The coupler is characterised in that the control signal is an optical signal, and in that the second waveguide is a U-shaped waveguide presenting a first and a second main sections parallel to the first waveguide and an intermediate section perpendicular to the other two and joined thereto by means of micro-mirrors, the first main section being coupled to the first waveguide through the grating and the second main section defining said second output, located on the same side of the device where the first output is placed.

For the sake of further clarification, reference is made to the accompanying drawings, wherein:

BRIEF DESCRIPTION OF THE DRAWINGS

With reference to FIG. 1, the device according to the invention, indicated in its entirety with reference 1, comprises a multiple-quantum well heterostructure on one of whose main faces a pair of optical waveguides 2, 3, specifically ridge waveguides, are formed. Waveguide 2 defines an input port 4 and a first output port 5 (transmission output) and waveguide 3 defines a second output port 6 (reflection output). In use, such ports are connected to respective optical transmission lines 7, 8, 9, in particular single mode optical fibres. A conventional coupler or other equivalent device, not shown, allows introducing into input fibre 7 both an optical information signal and an optical control or pump signal, of a wavelength differing from that of the information signal. The use of an optical control signal allows obtaining much higher switching speeds than those achievable with an electrical control signal, thanks to the elimination of the parasitic capacitances linked to the existence of electrical contacts and of power supply wires.

Figure 1:
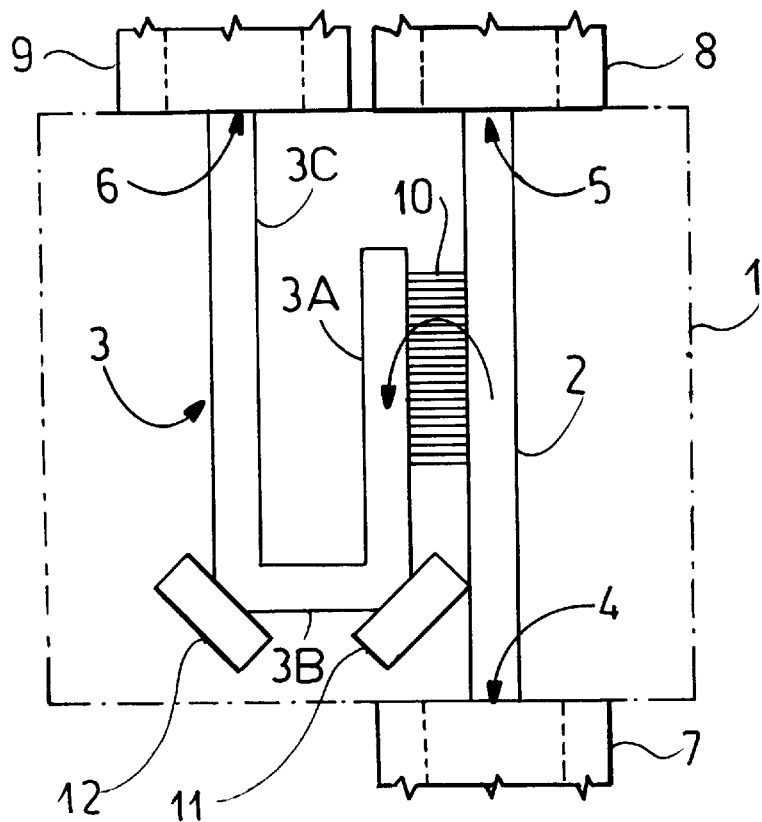
FIG. 1 is a schematic plan view of the device.

Waveguide 3 has essentially a U-shaped profile, with two sections 3A, 3C parallel to each other and to waveguide 2, and a third section 3B joining the other two. One of the parallel sections, in particular section 3A, is adjacent to waveguide 2 and it is coupled thereto contradirectionally by means of a distributed feedback grating 10, which, depending on its tuning, either couples into fibre 3 or transmits to output 5 an incoming radiation at a predetermined wavelength.

Grating 10 must be present at least in the area between waveguide 2 and the adjacent section 3A of waveguide 3, to be responsive to the intense field tail which propagates in that region. However, reasons of manufacturing simplicity may suggest forming the grating in such a way that it also extends at least in part over waveguides 2, 3A.

Section 3B of waveguide 3 is arranged essentially at a right angle with respect to sections 3A, 3C and the transfer of the radiation from one section to the next in waveguide 3 is obtained by means of micro-mirrors 11, 12. The use of micro-mirrors is preferred to forming curvilinear connecting zones because the radius of such zones cannot be reduced below a certain limit, as otherwise curvature losses would be excessive: as a consequence the dimensions of the device can be kept limited. Moreover, the behaviour of the mirrors in terms of crosstalk between adjacent channels is much better.

The distance between waveguide 2 and section 3A of waveguide 3 and the length of section 3B of waveguide 3 must be such as to allow mounting output fibres 8, 9; advantageously the arrangement of the waveguides is such that the axial distance between waveguide 2 and section 3C of waveguide 3 corresponds to the axial distance between two fibres 8, 9 arranged side by side (thus essentially 125 μm).

The U shape of waveguide 3 allows a good de-coupling between input 4 and output 6 and an easy mounting of input and output optical fibres 8, 9, and, above all, a simultaneous alignment of the latter.

Figure 2:
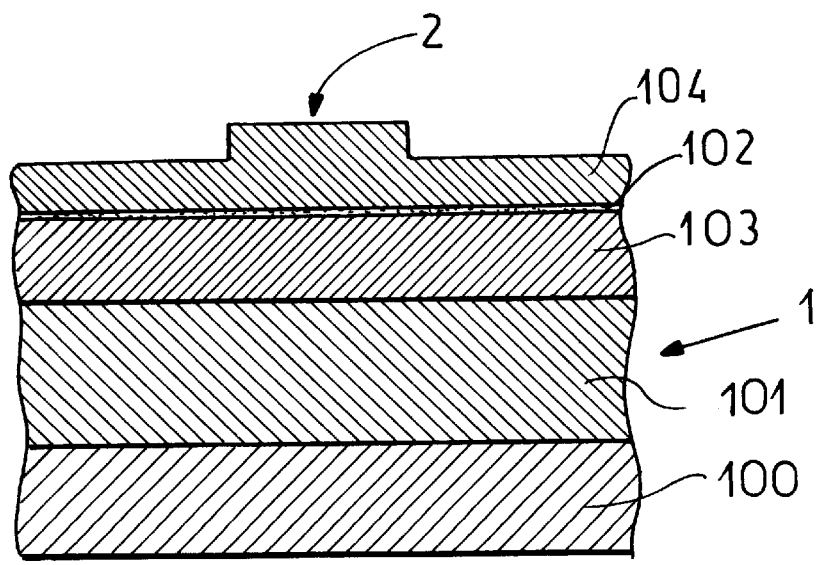
FIGS. 2, 3 are sectional views.
Figure 3:
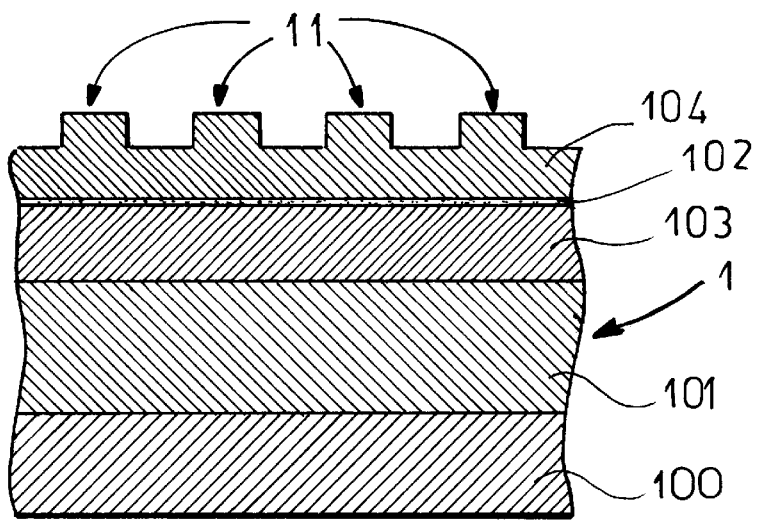

FIGS. 2, 3 show two cross sectional views of the device respectively according to a plane perpendicular to waveguide 2 and according a plane perpendicular to the grooves of grating 10. The device comprises a substrate 100 of n-doped InP, whereon there are grown a buffer layer 101 of InP (in a practical embodiment, with the thickness of 0,6 mm), the stack of multiple quantum wells 102 and barriers 103 (e.g. 30 $In_{0.53}Ga_{0.47}As$ wells, 5.5 nm thick, separated by 10 nm thick InP barriers) and lastly the capping layer 104, also of InP, 0.3 nm thick. Waveguides 2, 3 and grating 10 are formed in this last layer. Grating 10 in the embodiment, had a length of 300 mm and a pitch of 0.241 mm. Adjacent sections 2, 3A of the waveguides were spaced apart by 3 mm. The techniques for growing the various layers are the usual ones in the art (chemical beam epitaxy for the various layers of the device and reactive-ion etching for the mirrors and the grating).

The operating principle of the device described is evident, once one keeps in mind that grating 10 presents, under linear conditions (i.e. in the absence of pump pulses) a transmission stop band around the Bragg wavelength and, in correspondence therewith, a reflection pass band. Therefore a radiation injected into waveguide 2 passes to output 5 if its wavelength is outside both the transmission stop band and the reflection pass band of grating 10, and passes into waveguide 3 exiting through port 6 if its wavelength lies within the transmission stop band and within the reflection pass band of grating 10. In the presence of a control pulse of a power such that the overall energy of the incoming radiation exceeds the non-linearity threshold, a shift is caused both in the transmission stop band and in the reflection pass band. This shift, as is well known, depends on the pitch of the grating and on the refractive index, and hence on the injected power. Therefore, through an appropriate choice of the wavelength of the information signal and of the power associated to that signal and to the control pulse, the grating can be made to transmit the information signal under linear conditions, and to switch from transmitting operation to reflecting operation in the presence of the control pulse which brings the device to non-linear conditions.

By sending into the device a beam containing two wavelengths, through the pump pulses it is possible alternatively to send either wavelength to the transmission or to the reflection output, thereby obtaining a veritable cross-bar function.

Figure 4:
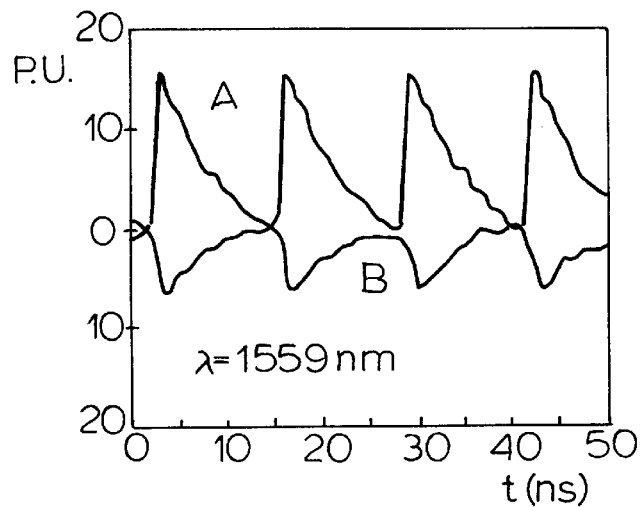
FIGS. 4, 5 are diagrams showing the operation of the invention used as a switch.
Figure 5:
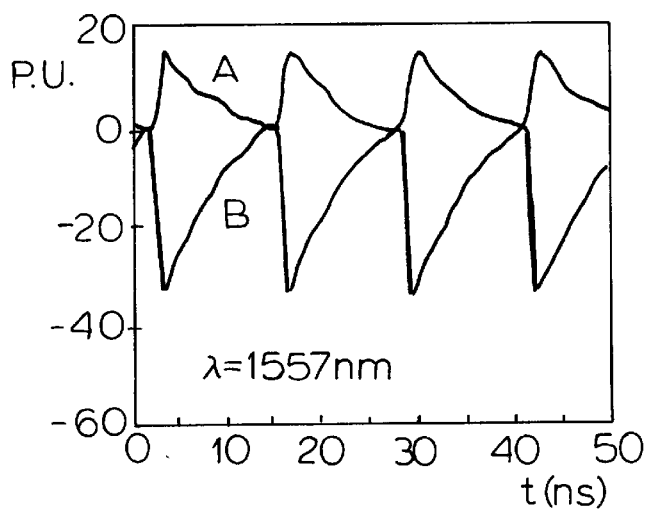

FIGS. 4, 5 show by way of example the behaviour of the device in the case of an input signal comprising two wavelengths respectively at 1559 nm and 1557 nm in the absence (FIG. 4) or in the presence (FIG. 5) of the control pulse, whose wavelength was 1640 nm. Output power P.U. (in arbitrary units) is plotted along the y-axis and time (in nanoseconds) is plotted along the x-axis. In FIG. 4, line A represents the output signal from port 5 and line B the output signal from port 6; in FIG. 5, line C represents the output signal from port 5 and line D the output signal from port 6: one can clearly see the complementary behaviour of the two wavelengths in the two cases.

To obtain a correct operation of the device, the power of the control pulses must be such as not to induce noticeable non-linearity effects due to virtual carriers, such as the optical Stark effect. Preferably, that power is maintained at a level about 3 orders of magnitude lower than the one that would give rise to such effects, specifically a power in the order of 1 pJ.

It is evident that the description above is provided purely by way of non limiting example and that variations and modifications are possible without thereby departing from the scope of the invention.

We claim:

1. Integrated optics non-linear optical coupler, comprising: a first and a second waveguide (2, 3), of which the first defines an input port (4) and a first output port (5) of the device (1) and the second defines a second output port (6) of the device (1); a grating (10) to couple contradirectionally the first and the second waveguides (2, 3) and to transfer an optical information signal to the first or to the second output (5, 6), by transmission or by reflection respectively; means (7) to inject into the first waveguide the optical information signal and a possible control signal able to bring the grating from a reflection condition to a transmission condition for a predetermined wavelength or vice versa; and means (8, 9) to extract the information signal from said outputs; characterised in that the control signal is an optical signal, and in that the second waveguide (3) is a U-shaped waveguide presenting a first and a second main section (3A, 3C) parallel to the first waveguide (2) and an intermediate section (3B) perpendicular to the other two sections and joined thereto by means of micro-mirrors (11, 12), the first main section (3A) being coupled to the first waveguide (2) through the grating (10) and the second main section (3B) defining said second output (6), positioned on the same side of the device where the first output (5) is located.

2. Coupler as claimed in claim 1, characterised in that the grating (10) is formed at least in the region between the first waveguide (2) and the first main section (3A) of the second waveguide (3).

3. Coupler as claimed in claim 1, characterised in that the grating (10) is formed in such a way as to overlap at least partially the first waveguide (2) and the first main section (3A) of the second waveguide.

4. Coupler as claimed in claim 2, characterised in that the distance between the first waveguide (2) and the first main section (3A) of the second waveguide, and between the latter and the second main section (3B), are such that the distance between the axes of said first waveguide (2) and of said second main section (3B) of the second waveguide essentially corresponds to the distance between the axes of two single mode optical fibres.

5. Coupler as claimed in claim 4, characterised in that said information signal comprises two wavelengths such that:

the first wavelength lies outside a transmission stop band and a corresponding reflection pass band of the grating (10) when the latter operates under linear conditions, in which only the information signal is launched into the first waveguide (2), and it lies within the transmission stop band and within the reflection pass band of the grating (10) when the latter operates under non-linear conditions, in which the information signal and a control pulse are launched into the first waveguide (2);

the second wavelength lies within the transmission stop band and the reflection pass band of the grating (10) when the latter operates under linear conditions, and it lies outside the transmission stop band and the reflection pass band of the grating (10) when the latter operates under non-linear conditions.

6. Coupler as claimed in claim 4, characterised in that the waveguides (2, 3) and the grating (10) are formed on the surface of a multiple quantum well structure.

* * * * *